United States Patent [19]
Chaya et al.

[11] Patent Number: 5,046,061
[45] Date of Patent: Sep. 3, 1991

[54] OPTICAL LIGHT BEAM SCANNER WITH ZERO ORDER BEAM REFLECTOR

[75] Inventors: Masahiko Chaya; Tatsuya Narahara, both of Kanagawa, Japan

[73] Assignee: Sony Corporation, Tokyo, Japan

[21] Appl. No.: 232,690

[22] Filed: Aug. 16, 1988

[30] Foreign Application Priority Data

Aug. 26, 1987 [JP] Japan ................................ 62-211568
Aug. 28, 1987 [JP] Japan ................................ 62-214624

[51] Int. Cl.⁵ .............................................. G11B 7/135
[52] U.S. Cl. .................................. 369/112; 369/44.24; 369/100
[58] Field of Search ................. 369/13, 100, 107, 110, 369/111, 112, 121, 44.37, 44.24; 350/96.18, 96.19, 379–380

[56] References Cited

U.S. PATENT DOCUMENTS

| | | | |
|---|---|---|---|
| 4,627,725 | 12/1986 | Nishio et al. | 369/112 X |
| 4,703,408 | 10/1987 | Yonezawa et al. | 369/112 X |
| 4,742,506 | 5/1988 | Fukumoto et al. | 369/112 X |
| 4,766,585 | 8/1988 | Fukumoto et al. | 369/112 X |
| 4,853,919 | 8/1989 | Miyawaki et al. | 369/112 X |
| 4,868,820 | 9/1989 | Nagashima et al. | 369/112 X |

OTHER PUBLICATIONS

Patents Abstracts of Japan, vol. 12, No. 366, p. 765, 9/30/88, and JP63-117324.

Primary Examiner—Roy N. Envall, Jr.
Assistant Examiner—W. R. Young
Attorney, Agent, or Firm—Lewis H. Eslinger; Jay H. Maioli

[57] ABSTRACT

An optical recording and/or reproducing apparatus employs an optical tape, an optical disc or the like as a record medium. The apparatus comprises an acousto-optic deflector which receives a light beam and generates a zero order beam which passes straight through the deflector and a first order beam which is deflected by the deflector. The zero and first order beams are separated from each other by a polarized beam splitter. The first order beam is projected via a ¼ wavelength plate onto an optical record medium, while the zero order beam, which does not contribute to recording or reproduction of information signals, is shunted aside so that it does not reach the optical record medium. The reflected light beam from the optical record medium is extracted by the same polarized beam splitter and used for reproduction of the information signals.

4 Claims, 2 Drawing Sheets

OPTICAL LIGHT BEAM SCANNER WITH ZERO ORDER BEAM REFLECTOR

BACKGROUND OF THE INVENTION

1. Field of the Invention

This invention relates to an optical recording and/or reproducing apparatus wherein an optical tape, an optical disc or the like is used as a record medium, and more particularly to an optical recording and/or reproducing apparatus of the type mentioned wherein a light beam is scanned using an acousto-optic deflector (AOD).

2. Description of the Prior Art

Optical recording and/or reproducing apparatus have been conventionally proposed wherein an optical tape, an optical disc or the like is used as a record medium and a light beam is scanned across such record medium by means of an acousto-optic deflector (AOD) to effect recording or reproduction of information signals on the record medium. One of such optical recording and/or recording apparatus is disclosed, for example, in Japanese Patent Application No. 61-261724 which has been filed in advance before the Japanese Patent Office by the applicant of the present patent application.

Such an optical recording and/or reproducing apparatus as described just above includes, as shown in FIG. 1, a laser beam source 101 which may be, for example, a laser diode. A light beam emitted from the laser beam source 101 is modulated, in the recording mode of the apparatus, in response to information signals to be recorded so that the intensity of the light beam is varied, but in the reproducing mode, it has a fixed intensity lower than the intensities of the light beam in the recording mode. The light beam is then transformed into a parallel laser beam by a predetermined optical part such as a collimator lens 102 and then introduced to an acousto-optic deflector 103. The incident light beam to the acousto-optic deflector 103 is controlled to be deflected by the acousto-optic deflector 103. The acousto-optic deflector 103 has a transducer 103a and an absorbing element 103b provided at a pair of opposing side faces thereof. The acousto-optic deflector 103 receives, at the transducer 103a thereof, a driving signal delivered from a deflector driving circuit 103c and repeatedly changes the deflection angle of the light beam within a predetermined angular range of the direction indicated by an arrow mark $\alpha$ in FIG. 1.

The light beam then passes a cylindrical lens 104 and a pair of relay lenses 105 and 106 and comes to an objective lens 107. The objective lens 107 focuses the light beam on a record face 109 of an optical record medium 108.

The light beam incident to the acousto-optic deflector 103 is controlled to deflect within the predetermined angle of the direction indicated by the arrow mark $\alpha$ in FIG. 1 so that it may be scanned such that the position on the record face 109 to which the light beam is focused by the objective lens 107 may be within a range from a first focal point indicated at $f_0$ in FIG. 1 to a second focal point indicated at $f_1$ in FIG. 1.

Meanwhile, the optical record medium 108 is moved in a direction perpendicular to the plane of FIG. 1, that is, in a direction perpendicular to the scanning direction of the light beam.

In the recording mode of the apparatus, the record face 109 of the optical record medium 108 undergoes chemical or physical changes by irradiation of a light beam, thereby effecting recording of information signals.

In order to reproduce, on the optical recording and/or reproducing apparatus, the information signals thus recorded on the optical record medium, a light beam reflected from the record medium 109 is taken out for detection thereof, for example, by means of a beam splitter 110 interposed between the collimator lens 102 and the acousto-optic deflector 103 as disclosed in Japanese Patent Application No. 61-261724 which has been filed in advance before the Japanese Patent Office by the applicant of the present patent application. In particular, in the reproducing mode of the apparatus, the light beam is scanned in such a manner as described above, reflected by the record face 109 and introduced again to the objective lens 107. Then, the reflected light beam passes the relay lenses 106 and 105, cylindrical lens 104 and acousto-optic deflector 103 and is introduced to the beam splitter 110. The reflected light beam is then reflected by the beam splitter 110 and introduced to an optical detecting means 111 which may comprise a detecting lens, an optical detector or the like. The optical detecting means 111 thus detects the reflected light beam from the beam splitter 110 to effect reproduction of the information signals.

By the way, in the case of the acousto-optic detector 103 which is used with such an optical recording and/or reproducing apparatus as described above, the light beam incident thereto is separated into a zero order light beam which passes the acousto-optic deflector 103 without causing diffraction and a first order light beam which passes the acousto-optic deflector 103 while being diffracted by the latter. The zero order light beam after having passed the acousto-optic deflector 103 is a light beam which is equivalent in its advancing direction and polarized condition to the incident light beam. Meanwhile, the first order light beam is controlled to deflect and also changed in polarized condition by the acousto-optic deflector. Accordingly, the first order light beam after having passed the acousto-optic deflector 103 is a light beam which is in a linearly polarized condition in the direction perpendicular to the direction of polarization of the incident light beam.

The zero order light beam then comes to the record medium 109 similarly to the first order light beam. Since the zero order light beam is not controlled to deflect by the acousto-optic deflector 103, it is always focused at a position on the record face 109 of the optical record medium 108 a little displaced from the scanning range of the first order light beam from the point $f_0$ to the other point $f_1$ in FIG. 1.

In this instance, the zero order light beam focused on the record face 109 of the optical record medium 108 writes, in the recording mode of the apparatus, information signals on the record face 109 similarly to the first order light beam. On the other hand, in the reproducing mode, the zero order light beam is reflected by the record face 109 similarly to the first order light beam. The zero order light beam reflected by the record face 109 then comes to the optical detecting means 111 similarly to the first order light beam reflected by the record face 109.

As the zero order light beam is focused on and reflected by the record face 109 and then comes to the optical detecting means 111, accurate recording or reproduction is not assured.

It may be recommended, in order to prevent such a bad effect of the zero order light beam which reaches the record face 109 as described above, to provide a screen plate 112 at an intermediate position between the relay lenses 105 and 106 at which the zero order light beam is focused as shown in FIG. 1. With the arrangement, the zero order light beam is interrupted by the screen plate 112.

However, when the first order light beam approaches the zero order light beam, that is, when the angle at which the first order light beam is diffracted by the acousto-optic deflector 103 is small, there is the possibility that the first order light beam may be interrupted together with the zero order light beam by the screen plate 112. Accordingly, recording or reproduction of information signals by the first order light beam is permitted only when the first order light beam is scanned within an angular range of the scanning angle thereof in which it is not interrupted by the screen plate 112.

The angular range within which the first order light beam is controlled to deflect by the acousto-optic deflector 103 is several degrees and thus small. Within the angular range within which the first order light beam is controlled to deflect, the angular range effective for recording and/or reproduction of information signals is further reduced by the screen plate 112. This has a bad influence on improvements in recording density of information signals on the record face 109 of the optical record medium 108. Besides, it is required to maintain the location of the screen plate 112 with a high degree of accuracy, which complicates assembly and adjustment of the apparatus and thus deteriorates practical use.

Otherwise, it may be recommended to separate the zero order light beam and the first order light beam from each other using an optical part wherein the transmissivity has a polarization dependency such as, for example, a polar screen making use of a difference in polarized condition between the zero order light beam and the first order light beam. It is necessary, however, to provide means for separating the zero order light beam and the first order light beam from each other and independent means for taking out the light beam reflected by the record face 109 of the optical record medium 108 to detect the light beam. This results in a complicated construction of the apparatus.

SUMMARY OF THE INVENTION

It is an object of the present invention to provide an optical recording and/or reproducing apparatus wherein accurate recording and/or reproduction is assured and the recording density is improved with a simplified construction.

In order to attain the object, according to the present invention, an optical recording and/or reproducing apparatus comprises a laser beam source, collimation means for transforming a laser beam from the laser beam source into a parallel laser beam, acousto-optic deflector means which receives the parallel laser beam from the collimation means and generates a zero order beam and a first order beam, beam splitting means having a polarized beam splitting surface for separating the zero order beam and the first order beam received from the acousto-optic deflector means from each other, polarizing means interposed in a path of the first order beam from the beam splitting means, and focusing means for focusing the first order beam obtained from the polarizing means on an optical record medium.

With the optical recording and/or reproducing apparatus according to the present invention, the first order light beam which is controlled to deflect by the acousto-optic means deflector and a zero order light beam which is not controlled to deflect by the acousto-optic deflector means are separated from each other by the beam splitting means. The first order light beam is then introduced to a record face of an optical record medium by way of the polarizing means. The first order light beam thus reflected by the record face is taken out by way of the beam splitting means.

Accordingly, the zero order light beam which does not contribute to recording nor reproduction of information signals can be introduced so that it may not come to the optical record medium. Meanwhile, recording and/or reproduction can be made over the entire scanning range of the first order light beam.

Further, the first order light beam reflected from the record face of the optical record medium can be taken out by the same beam splitting means as the beam splitting means which is provided for separating the zero order light beam and the first order light beam from each other. Thus, since the single beam splitting means has the two functions, simplification in construction and reduction in size of the apparatus can be attained.

Accordingly, the present invention can provide an optical recording and/or reproducing apparatus which can attain, with a simple construction of a small size, assurance of accurate recording and/or reproduction over the entire scanning range of the first order light beam and improvement in recording density. Further, if an elliptic laser beam is generated by a laser diode as the laser beam source, an optical recording and/or reproducing apparatus of a simplified construction can be realized without using an optical element such as a beam expander.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
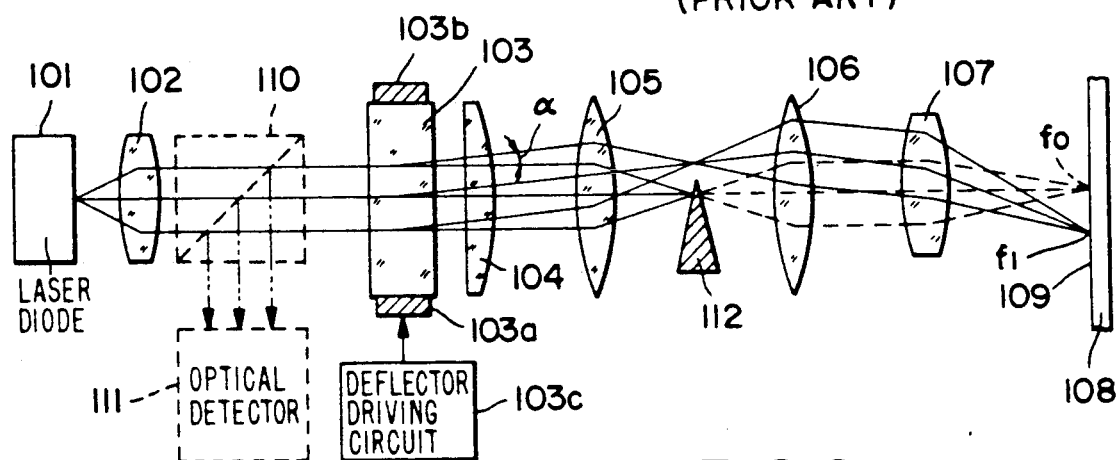
FIG. 1 is a diagrammatic elevational view of an exemplary conventional optical recording and/or reproducing apparatus.
Figure 2:
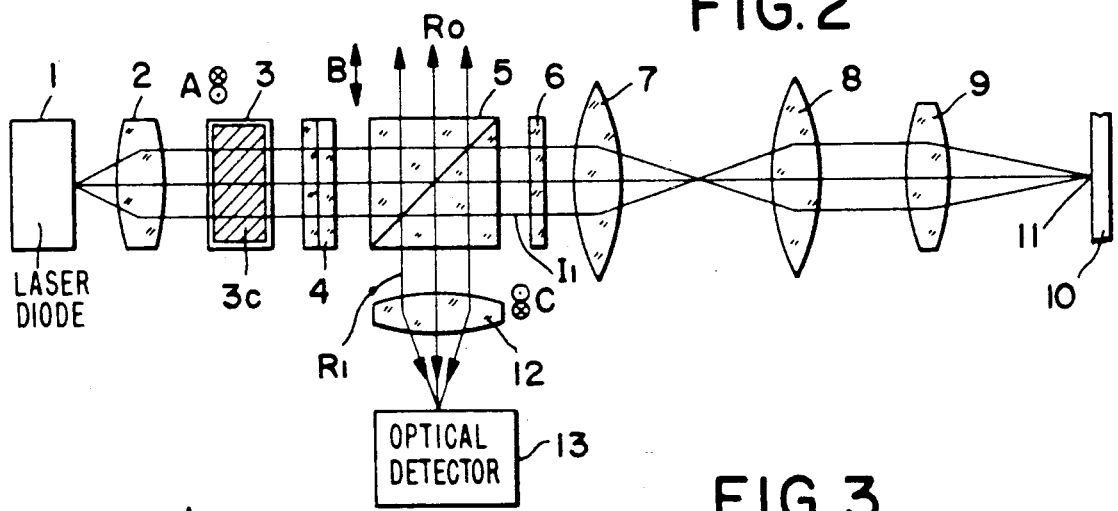
FIG. 2 is a diagrammatic plan view of an optical recording and/or reproducing apparatus showing a preferred embodiment of the present invention.
Figure 3:
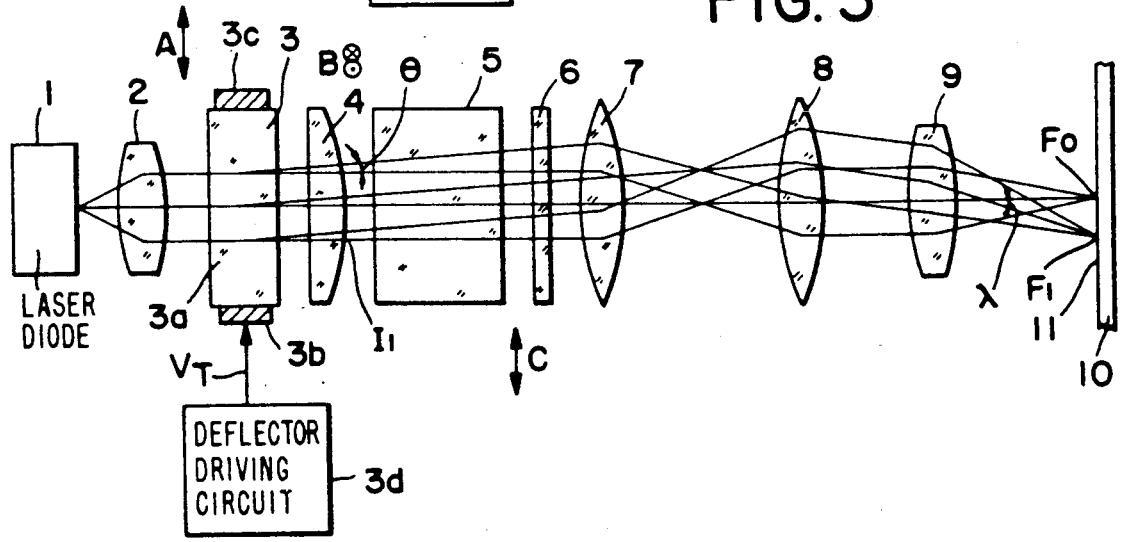
FIG. 3 is a diagrammatic side elevational view of the optical recording and/or reproducing apparatus of FIG. 2.

Referring first to FIGS. 2 and 3, there is shown an optical recording and/or reproducing apparatus according to the present invention. The optical recording and/or reproducing apparatus shown includes a recording and/or reproducing light source 1 which may be a laser diode. A recording and/or reproducing light beam emitted from the recording and/or reproducing light source 1 has a predetermined wavelength, for example, of 780 nm or so and is modulated, in the recording mode of the apparatus, in response to information signals to be recorded so that it is changed in its intensity, but in the reproducing mode, it has a fixed intensity lower than that of the light beam in the recording mode. Meanwhile, the recording and/or reproducing beam is in a linearly polarized condition in a direction perpendicular to the plane of FIG. 2, that is, in a direction parallel to the plane of FIG. 3.

In either of the recording and reproducing modes of the apparatus, the recording and/or reproducing light beam is transformed into a parallel light beam by a collimator lens 2 and then introduced to an acousto-optic deflector (AOD) 3.

The acousto-optic deflector 3 has a median portion 3a composed of an anisotropic crystal, for example, of $TeO_2$ or $PbMoO_4$ and, making use of the fact that the diffraction angle in the Bragg diffraction or in the Debye-Sears effect increases substantially in proportion to the frequency of ultrasonic waves transmitted in the median portion 3a, modulates the frequency of ultrasonic waves transmitted in the median portion 3a to effect light polarizing control.

In the present embodiment, an acousto-optic deflector of the anisotropic Bragg diffraction type is employed as the acousto-optic deflector 3. The recording and/or reproducing light beam incident to the median portion 3a of the acousto-optic deflector 3 is separated into a zero order light beam and a first order light beam due to diffraction thereof in the median portion 3a.

The acousto-optic deflector 3 of the anisotropic Bragg diffraction type further has a transducer 3b and an absorbing element 3c at a pair of opposing side faces of the median portion 3a thereof. The transducer 3b receives a driving signal $V_T$ and generates ultrasonic waves. The driving signal $V_T$ is delivered from a deflector driving circuit 3d and frequency modulated in response to a predetermined scanning signal. As the ultrasonic waves are transmitted in the median portion 3a, the first order light beam is changed in its diffraction angle in a plane in which the transducer 3b and the absorbing portion 3c oppose each other, that is, in a plane parallel to the plane of FIG. 3 within a predetermined angular range in the direction indicated by an arrow mark $\theta$ in FIG. 3 while it passes the median portion 3a. The change of the diffraction angle has a substantially proportional relationship to the frequency of ultrasonic waves generated by the transducer 3b. Since the frequency of the ultrasonic waves is frequency modulated in response to the scanning signal, the diffraction angle of the first order beam after passing the median portion 3a is controlled in response to the scanning signal.

Further, the median portion 3a of the acousto-optic deflector 3 changes the polarized condition of the first order light beam. As the first order light beam passes the median portion 3a, it is transformed into a light beam linearly polarized in a direction perpendicular to the direction of polarization of the recording and/or reproducing light beam before it enters the median portion 3a as indicated by arrow marks B in FIGS. 2 and 3.

It is to be noted that the zero order light beam is equivalent in its advancing direction and polarized condition to the recording and/or reproducing beam before entering the median portion 3a. Accordingly, the first order light beam and the zero order light beam are polarized in directions perpendicular to each other.

The recording and/or reproducing light beam separated into the zero order light beam and the first order light beam is then introduced to the polarized beam splitter 5 via the cylindrical lens 4. The zero order light beam is thus reflected by a reflecting face of the polarized beam splitter 5 as indicated at $R_0$ in FIG. 2 because the reflecting face thereof is arranged in a parallel relationship to the direction of polarization of the zero order light beam. On the other hand, the first order light beam passes through the polarized beam splitter 5 as indicated at $I_1$ in FIG. 2 because it is in a linearly polarized condition perpendicularly to the direction of polarization of the zero order light beam as described hereinabove. In this manner, the zero order light beam and the first order light beam are separated from each other by the polarized beam splitter 5.

The first order light beam having passed the polarized beam splitter 5 then comes to a ¼ wavelength plate 6. The first order light beam is thus transformed into a circularly polarized condition by the ¼ wavelength plate 6 and then introduced via a pair of relay lenses 7 and 8 to an objective lens 9. The objective lens 9 focuses the first order light beam on a record face 11 of an optical record medium 10. The optical record medium 10 may be in the form of a disk, a card or a tape, and the record face 11 thereof has a light sensitivity.

The first order light beam is controlled in response to a predetermined scanning signal to deflect within a predetermined range of the diffraction angle in the direction indicated by the arrow mark $\theta$ in FIG. 3 so that it is deflected, after passing the relay lenses 7 and 8, within a predetermined angular range of the direction indicated by an arrow mark $\lambda$ in FIG. 3. Consequently, the point at which the first order light beam is focused on the record face 11 by the objective lens 9 is scanned within a range from a first focus position indicated at $F_0$ in FIG. 3 to a second focus position indicated at $F_1$ in FIG. 3 in response to a predetermined scanning signal. The optical record medium 10 is moved in a direction perpendicular to the plane of FIG. 3, that is, in a direction perpendicular to the scanning direction of the first order light beam.

In the recording mode of the apparatus, chemical or physical changes take place on the record face 11 of the optical record medium 10 by light energy of the first order light beam of the recording light beam being scanned, thereby recording predetermined information signals on the record face 11.

On the other hand, in the reproducing mode, the first order light beam of the reproducing light beam is reflected by the record face 11 and then introduced successively to the objective lens 9, relay lenses 8 and 7 and ¼ wavelength plate 6. In this instance, the first order light beam is in a circularly polarized condition in the reverse direction to that before it is reflected by the record face 11. Accordingly, as the first order light beam passes the ¼ wavelength plate 6, it is transformed into a light beam linearly polarized in a direction perpendicular to the direction of polarization of the first order light beam before it enters the ¼ wavelength plate 6 after having passed the acousto-optical deflector 3 as indicated by an arrow mark C in FIGS. 2 and 3. Consequently, the first order light beam is then reflected by the reflecting face of the polarized beam splitter 5 as indicated at $R_1$ in FIG. 2 and is then introduced to a detecting lens 12. The detecting lens 12 focuses the first order light beam on an optical sensor 13. The optical sensor 13 receives the first order light beam and develops a reproduction signal.

With the optical recording and/or reproducing apparatus of the present embodiment, the zero order light beam having passed the acousto-optic deflector 3 is separated by the polarized beam splitter 5 and will not reach the record face 11 of the optical record medium 10 at all as described hereinabove. Accordingly, accurate recording and/or reproduction of information signals can be assured over the entire scanning range of the first order light beam across the record face 11. Further, in the reproducing mode of the apparatus, since the first order light beam reflected by the record face 11 is taken out intermediately from a returning light path toward the recording and/or reproducing light source 1 by means of the polarized beam splitter 5, it can be readily detected by the optical detector 13 to effect reproduction of information signals.

It is to be noted that the present invention is not limited to the specific embodiment described above and can be suitably modified or altered. For example, while in the embodiment described above the zero order light beam is reflected by the reflecting face of the polarized beam splitter 5 while the first order light beam passes the polarized beam splitter 5 and reaches the record medium 10, the relationship may be modified such that, as shown in FIG. 4, the zero order light beam passes the polarized beam splitter 5 while the first order light beam is reflected by the reflecting face of the polarized beam splitter 5 and reaches the record medium 10.

Figure 4:
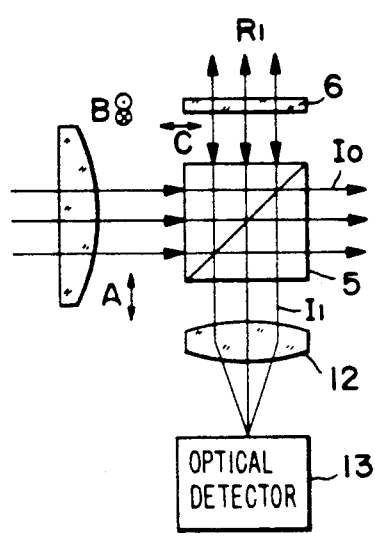
FIG. 4 is a diagrammatic plan view showing a modified form to the optical recording and/or reproducing apparatus of FIG. 2.

In the modification shown in FIG. 4, the polarized beam splitter 5 is arranged such that the reflecting face thereof may extend in parallel to the direction of polarization of the first order light beam indicated by an arrow mark B in FIG. 4. The first order light beam is thus reflected in such a manner as indicated at $R_1$ in FIG. 4 by the reflecting face of the polarized beam splitter 5 and is directed to the optical record medium 10 via the ¼ wavelength plate 6. Meanwhile, the zero order light beam passes the polarized beam splitter 5 as indicated at $I_0$ in FIG. 4 because it has been transformed into a linearly polarized light beam in a direction perpendicular to the direction of polarization of the first order light beam indicated by an arrow mark A in FIG. 4. The first order light beam reflected by the record face 11 then passes the polarized beam splitter 5 as indicated at $I_1$ in FIG. 4 since it is in a linearly polarized condition in a direction indicated by an arrow mark C in FIG. 4 which is perpendicular to the direction of polarization of the first order light beam before it enters the polarized beam splitter 5. Consequently, the first order light beam reaches the detecting lens 12. Also with the arrangement shown in FIG. 4, similar effects to those of the embodiment described hereinabove can be attained because the reflected light beam from the record face 11 of the optical record medium 10 is taken out in such a manner as described above.

It is to be noted that the cylindrical lens 4 and the relay lenses 7 and 8 are not essential and may be omitted suitably when the present invention is put into practice.

Figure 5:
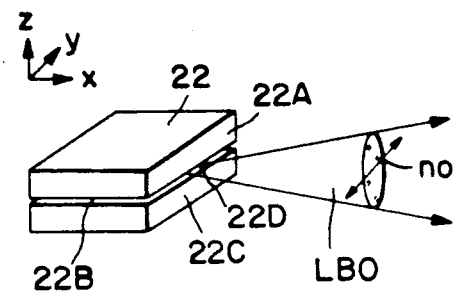
FIG. 5 is a diagrammatic perspective view showing a semiconductor laser as a recording and/or reproducing light source.

By the way, a semiconductor laser which may be used as the laser diode 1 generates a laser beam of the following characteristics. In particular, as shown in FIG. 5 to which an orthogonal coordinate system XYZ is applied, a semiconductor laser 22 includes a pn junction portion 22B formed therein such that it may extend on the XY plane at a central portion of a parallelepiped semiconductor chip 22A in the vertical direction, that is, in the Z axis direction. The semiconductor laser 22 thus emits a laser beam LB0 outwardly in the depthwise direction, that is, in the X axis direction from an emitting portion 22D thereof which is exposed on a front face 22C of the semiconductor chip 22A.

Figure 6:
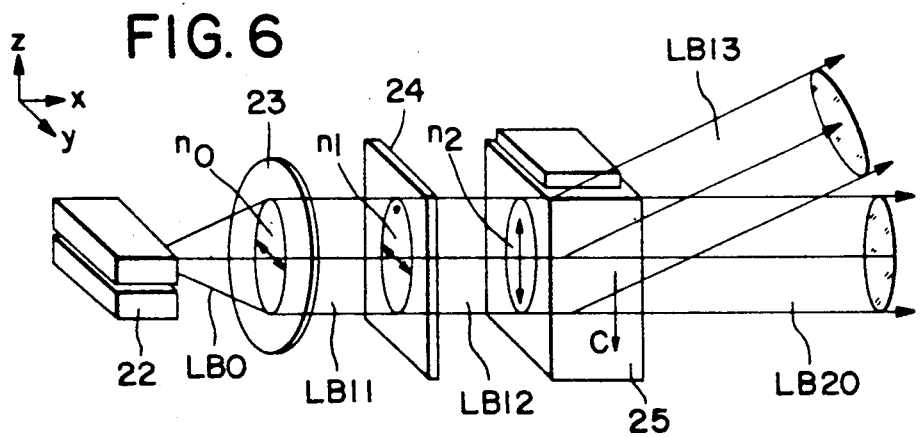
FIG. 6 is a diagrammatic perspective view showing a scanning light beam generating device in which the semiconductor laser is employed.

The laser beam LB0 emitted from the semiconductor laser 22 of such a construction as described just above has, as shown in FIG. 6 to which an orthogonal coordinate system is applied with reference to the front face 22C of the semiconductor ship 22A, an elliptical cross section which has a minor axis in the widthwise direction of the pn junction portion 22B (i.e., in the Y axis direction) and a major axis in the vertical direction perpendicular to the widthwise direction (i.e., in the Z axis direction).

In addition, the polarization plane of the laser beam LB0 oscillates in the Y axis direction such that it may extend in the widthwise direction of the pn junction portion 22B as indicated by an arrow mark n0 in FIG. 5.

Where it is intended to form a light spot for scanning across an optical record medium with such an arrangement as shown in FIGS. 2 and 3 in which a semiconductor laser having such characteristics as described above and an acousto-optic deflector are employed, it is desired, in order to convert the light energy of an incident light beam into a first order diffracted light beam with the highest possible efficiency, that the incident light beam have such a cross section as to allow the incident light beam to be irradiated over an entire acoustic wave pattern formed within an acousto-optic deflector and that the direction of polarization of the linearly polarized incident light beam (indicated by arrow marks A in FIGS. 2 to 4) be coincident with the advancing direction of the acoustic wave pattern. If such an arrangement as shown in FIG. 6 is employed to this end, a scanning light beam can be generated in a higher efficiency.

In particular, referring to FIG. 6, a laser beam LB0 emitted from a semiconductor laser 22 is converted into a parallel light beam LB11 by a collimator lens 23 which may be an infinite conjugate convex lens. The parallel light beam LB11 is then introduced into a rotary polarizer 24.

The rotary polarizer 24 may be a ½ wavelength plate, for example, and is positioned such that the optical axis thereof is inclined by an angle of 45 degrees with respect to the parallel light beam LB11. Consequently, the plane of polarization of the parallel light beam LB11 incident to the rotary polarizer 24 is rotated by an angle of 90 degrees to form an incident light beam LB12 which is then introduced to an acousto-optic deflector 25.

The acousto-optic deflector 25 thus emits such a scanning light beam LB13 as will deflect the incident light beam LB12 within the ZX plane in response to a driving signal coupled to a transducer thereof in a similar manner to that described hereinabove with reference to FIG. 3.

Figure 8:
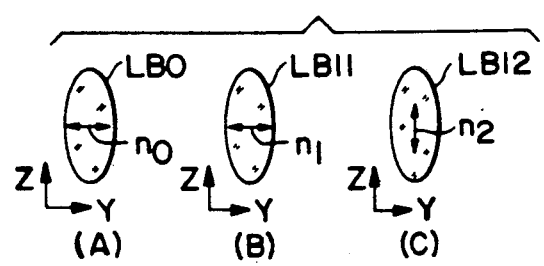
FIGS. 8A, 8B and 8C are diagrammatic representations illustrating cross sections and orientations of polarization planes of a laser beam, a parallel light beam and an incident light beam, respectively, in the scanning light beam generating device of FIG. 6.

In this instance, the shapes of cross sections and the orientations of polarization planes of the laser beam LB0 emitted from the semiconductor laser 22 serving as a light source, the parallel light beam LB11 and the incident light beam LB12 vary as illustrated in FIGS. 8A, 8B and 8C.

In particular, the laser light beam LB0 emitted from the semiconductor laser 22 exhibits, as shown in FIG. 8A, an elliptic cross section having a minor axis in the Y axis direction and a major axis in the Z axis direction and has a polarization plane in the Y axis direction as indicated by an arrow mark n0.

Since the laser light beam LB0 is converted into the parallel light beam LB11 by the collimator lens 23, the parallel light beam LB11 emitted from the collimator lens 23 exhibits, as shown in FIG. 8B, an elliptic cross section having a minor axis in the Y axis direction and a major axis in the Z axis direction and has a polarization plane in the Y axis direction as indicated by an arrow mark n1.

To the contrary, since the rotatory polarizer 24 acts to rotate the parallel light beam LB11 by an angle of 90 degrees, the incident light beam LB12 is polarized such that it may exhibit, as shown in FIG. 8C, an elliptic cross section having a minor axis in the Y axis direction and a major axis in the Z axis direction and oscillate in the Z axis direction as indicated by an arrow mark n2.

Thus, the incident light beam LB12 incident to the incident axis of the acousto-optic deflector 25 (FIG. 6) has its major axis extending in the advancing direction c (i.e., in the Z axis direction) of an acoustic wave pattern formed in the acousto-optic deflector 25 while it has its minor axis in a direction perpendicular to the advancing direction c of such acoustic wave pattern (i.e., in the Y axis direction). Accordingly, the incident light beam LB12 has a cross section substantially conforming to the shape of the acoustic wave pattern which similarly has its major axis in the Z axis direction and its minor axis in the Y axis direction.

In addition, since the incident light beam LB12 incident to the acoustic wave pattern can be introduced such that it may have a polarization plane in a direction transverse to an optical diffraction grating formed by the acoustic wave pattern, the Bragg diffracting action caused by the acoustic wave pattern can be caused with highest efficiency. Accordingly, a light beam of a further higher light intensity can be produced as the scanning light beam LB13 (FIG. 6).

Incidentally, where it is intended to produce a scanning light beam LB13 having an opening of a cross section having a minor axis $D_Y$ and a major axis $D_Z$ as described hereinabove with reference to FIG. 4 on an incident face of the acousto-optic deflector 25 with the arrangement of FIG. 6, when the distance $D_X$ between the semiconductor laser 22 and the collimator lens 23 is given by $$D_X = \frac{\frac{D_Z}{2}}{\tan\left(\frac{\theta_Z}{2}\right)} \quad (1)$$

the distance $D_X$ should be a value which satisfies a following expression $$\frac{D_Y}{2} \geq D_X \cdot \tan\left(\frac{\theta_Y}{2}\right) \quad (2)$$

as a requirement in the direction of the minor axis.

Figure 7:
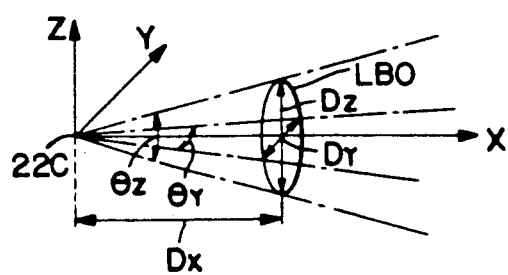
FIG. 7 is a diagrammatic illustration showing different parameters of the scanning light beam generating device of FIG. 6.

Here, $D_Y$ is a length of the minor axis, $D_Z$ a length of the major axis, $\theta_Y$ an opening angle of the laser beam LB0 on the minor axis, and $\theta_Z$ an opening angle of the laser beam LB0 on the major axis, as illustratively shown in FIG. 7.

An experiment has revealed that, using a semiconductor laser as a light source, a light beam having an opening of $D_Y = 3$ mm and $D_Z = 10$ mm or so can be realized as the incident light beam LB12 which satisfies such a requirement as described above.

With the construction described above, an incident light beam LB12 having an elliptic shape so that the scanning light beam LB13 may be produced with high efficiency can be produced for an acoustic wave pattern formed in the acousto-optic defector 25.

Having now fully described the invention, it will be apparent to one of ordinary skill in the art that many changes and modifications can be made thereto without departing from the spirit and scope of the invention as set forth herein.

What is claimed is:

1. An optical recording and/or reproducing apparatus, comprising:
   laser beam source means for generating a laser beam that is information modulated during recording and has a fixed intensity during reproducing;
   collimation means for receiving the laser beam and transforming it into a collimated laser beam;
   acousto-optic deflector means for receiving the collimated laser beam and generating therefrom a zero order beam that is in the same direction as the collimated laser beam and a deflected first order beam that is linearly polarized in a direction perpendicular to a direction of polarization of the collimated laser light beam for scanning an optical record medium;
   polarized beam splitting means having a polarized beam splitting surface for receiving and separating from each other the zero order beam and the linearly polarized first order beam to produce in a first direction the zero order beam and to produce in a second direction a separated, deflected first order beam;
   circular polarizing means arranged in said second direction relative to said polarized beam splitting means for receiving the separated, deflected first order beam and producing therefrom a circularly polarized, deflected first order beam; and
   focusing means for receiving and focusing the polarized, deflected first order beam on the optical record medium.

2. An optical recording and/or reproducing apparatus as recited in claim 1, further comprising second circular polarizing means interposed between said laser beam source means and said acousto-optic deflector means.

3. An optical recording apparatus recited in claim 2, wherein said laser beam source means is a laser diode which generates an elliptic laser beam to be projected on said second polarizing means through said collimation means.

4. An optical recording and/or reproducing apparatus as recited in claim 1, wherein said polarized beam splitting surface of said beam splitting means reflects the zero order beam in said first direction and transmits the deflected, first order beam therethrough in said second direction.

* * * * *